United States Patent
Degenaro et al.

(10) Patent No.: US 6,725,333 B1
(45) Date of Patent: Apr. 20, 2004

(54) SYSTEM AND METHOD FOR MANAGING CACHABLE ENTITIES

(75) Inventors: Louis R. Degenaro, White Plains, NY (US); Arun K. Iyengar, Yorktown Heights, NY (US); Isabelle M. Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/298,046

(22) Filed: Apr. 22, 1999

(51) Int. Cl.$^7$ ................................................ G06F 12/00
(52) U.S. Cl. ........................................................ 711/118
(58) Field of Search .............................. 707/8; 711/141, 711/146, 118; 712/227; 717/141

(56) References Cited

U.S. PATENT DOCUMENTS

| | | | | |
|---|---|---|---|---|
| 5,572,703 A | * | 11/1996 | MacWilliams et al. | 711/146 |
| 5,655,122 A | * | 8/1997 | Wu | 717/152 |
| 5,668,987 A | * | 9/1997 | Schneider | 707/2 |
| 5,787,287 A | * | 7/1998 | Bharadwaj | 717/144 |
| 5,940,622 A | * | 8/1999 | Patel | 717/158 |
| 5,940,857 A | * | 8/1999 | Nakanishi et al. | 711/137 |
| 6,009,271 A | * | 12/1999 | Whatley | 707/203 |
| 6,021,470 A | * | 2/2000 | Frank et al. | 711/118 |
| 6,049,866 A | * | 4/2000 | Earl | 711/141 |
| 6,055,621 A | * | 4/2000 | Puzak | 712/207 |
| 6,295,608 B1 | * | 9/2001 | Parkes et al. | 714/1 |
| 6,401,192 B1 | * | 6/2002 | Schroter et al. | 711/137 |

OTHER PUBLICATIONS

Choi et al. Techniques for Compiler–Directed Cache Coherence. IEEE Parallel & Distributed Technology, pp. 23–34, Winter 1996.*

Cytron, R. et al., Automatic management of programmable caches, Proceedings of the 1988 International Conference on Parallel Processing, 1988, pp. 229–238.*

Mounes–Toussi, F. et al., An evaluation of a compiler optimization for improving the performance of a coherence directory, International Conference on Supercomputing, 1994; pp. 75–84.*

* cited by examiner

*Primary Examiner*—Matthew Kim
*Assistant Examiner*—Woo H. Choi
(74) *Attorney, Agent, or Firm*—F. Chau & Associates, LLC

(57) ABSTRACT

A system and method for managing cachable entities (i.e., entities stored in a cache and/or entities which may be stored in a cache) in a data processing application. In one aspect, a method for managing cachable entities comprises the steps of analyzing program code to determine if there is at least one statement which affects a desirability of performing at least one cache transaction; and performing the at least one cache transaction if it is desired. In another aspect, a program analysis tool statically analyzes program code to locate points where object state changes occur, where objects are created and where objects are deleted, and then generates regularized dependencies at such points for and employing the dependencies to invalidate dependent cached queries. Query specific keys are generated to insert query results into and retrieve query results from a dependency managed cache. Regularized dependencies are generated at the object query points and are attached to query results inserted into a dependency managed cache, which facilitates consistency of query results from the dependency managed cache.

37 Claims, 6 Drawing Sheets

SYSTEM AND METHOD FOR MANAGING CACHABLE ENTITIES

BACKGROUND

1. Technical Field

The present invention relates generally to caching information in a data processing system and, in particular, to a system and method for managing cachable entities by analyzing program (source) code to detect one or more statements which may affect a desirability of performing one or more cache transactions such as storing an entity in cache and/or invalidating or updating cached entities.

2. Description of Related Art

Caching is a technique which is commonly utilized for improving performance on many computer systems. For example, in an object-oriented computing environment, caching an object can minimize the cost for fetching or creating an object since it is only incurred once. Specifically, subsequent requests for a cached object can be satisfied from the cache, a process which incurs significantly less overhead than recalculating the object or fetching it from a remote location.

Object-oriented and other database applications often issue queries to databases. These queries can be expensive to make in terms of, e.g., computation time and memory. Caching techniques may be utilized for reducing the overhead associated with issuing queries by caching query results such that the query need only be issued once. Subsequent requests for the same query would be able to access the corresponding query results from the cache.

A key problem associated with caching query results in many data processing environments is keeping the cache information updated after the database content is modified. In particular, if the database modification affects one or more cached query results, the cache should be updated to reflect the changes, otherwise, incorrect data could be returned. Due to the difficulty in efficiently keeping the cache updated, database systems typically do not cache query results. Therefore, there is a need for a system and method for automatically maintaining and updating cache content in a data processing system in response to a change in the underlying data content.

SUMMARY OF THE INVENTION

The present invention is directed to a system and method for managing cachable entities (i.e., entities stored in a cache and/or entities which may be stored in a cache) in a data processing application. In one aspect of the present invention, a method for managing cachable entities comprises the steps of:

analyzing program code to determine if there is at least one statement which affects a desirability of performing at least one cache transaction; and performing the at least one cache transaction if it is desired.

In another aspect, the present invention provides a program analysis tool for statically analyzing program code to locate points where object state changes occur, where objects are created and where objects are deleted, and then generating regularized dependencies at such points for and employing the dependencies to invalidate dependent cached queries.

In yet another aspect, the present invention provides a mechanism for generating query specific keys which are employed to insert query results into and retrieve query results from a dependency managed cache.

In another aspect, the present invention provides a mechanism for selected cache repopulation of invalidated queries.

In yet another aspect, the present invention provides a mechanism for generation of regularized dependencies at the object query points and for attaching them to query results inserted into a dependency managed cache.

In another aspect, the present invention provides a mechanism to insert/retrieve query results into/from a dependency managed cache.

In yet another aspect, the present invention provides a mechanism to delegate requests for query results to an underlying object query service when necessary.

In another aspect, the present invention provides a mechanism for selected cache initial population of anticipated queries.

One advantage of the present invention is that it improves response time for queries issued multiple times. Improvement is accomplished by obtaining results more efficiently from a dependency managed cache, thus bypassing the normally used but usually less efficient object query machinery.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the system elements described herein may be implemented in various forms of hardware, software, firmware, special purpose processors, or a combination thereof. Preferably, the present invention is implemented in software as an application program tangibly embodied on a program storage device. The application program may be uploaded to and executed by a machine having any suitable architecture. Preferably, the machine is implemented on a computer platform comprising hardware such as one or more central processing units (CPU), a random access memory (RAM), and input/output (I/O) interface(s). The computer platform also includes an operating system and microinstruction code. The various processes and functions described herein may either be part of the microinstruction code or part of an application program (or a combination thereof) which is executed via the operating system. In addition, various other peripheral devices may be connected to the computer platform such as an additional data storage device and a printing device.

It is to be further understood that, because the constituent system components and method steps depicted in the accompanying Figures are preferably implemented in software, the actual connections between the system modules (or the process steps) may differ depending upon the manner in which the present invention is programmed. Given the teachings herein, one of ordinary skill in the related art will be able to contemplate these and similar implementations or configurations of the system and method described herein.

It is to be further understood that the present invention may be implemented in any object-oriented and database data processing systems for managing cachable entities. Notwithstanding that the invention described herein may be employed in various data processing systems, for purposes of illustration, the system and methods set forth herein (as well as the exemplary program code) will be discussed in relation to International Business Machines' WebSphere™, a middleware product that can be used to design, develop and deploy distributed object-oriented applications, in which the cachable entities are query results. One aspect of the WebSphere™ system is currently implemented utilizing C++ programming language source code. With IBM's WebSphere™ system, an object creation function and an object deletion function are referred to as a "create" method and a "delete" method, respectively. In addition, an object state change function is referred to as a "set attribute method." Also, a query function for retrieving a collection of objects is referred to as a "find" method. Although these terms will be used in the following description, it is to be understood that such terms also refer to analogous functions of other data processing systems in which the present invention may be employed.

Figure 1:
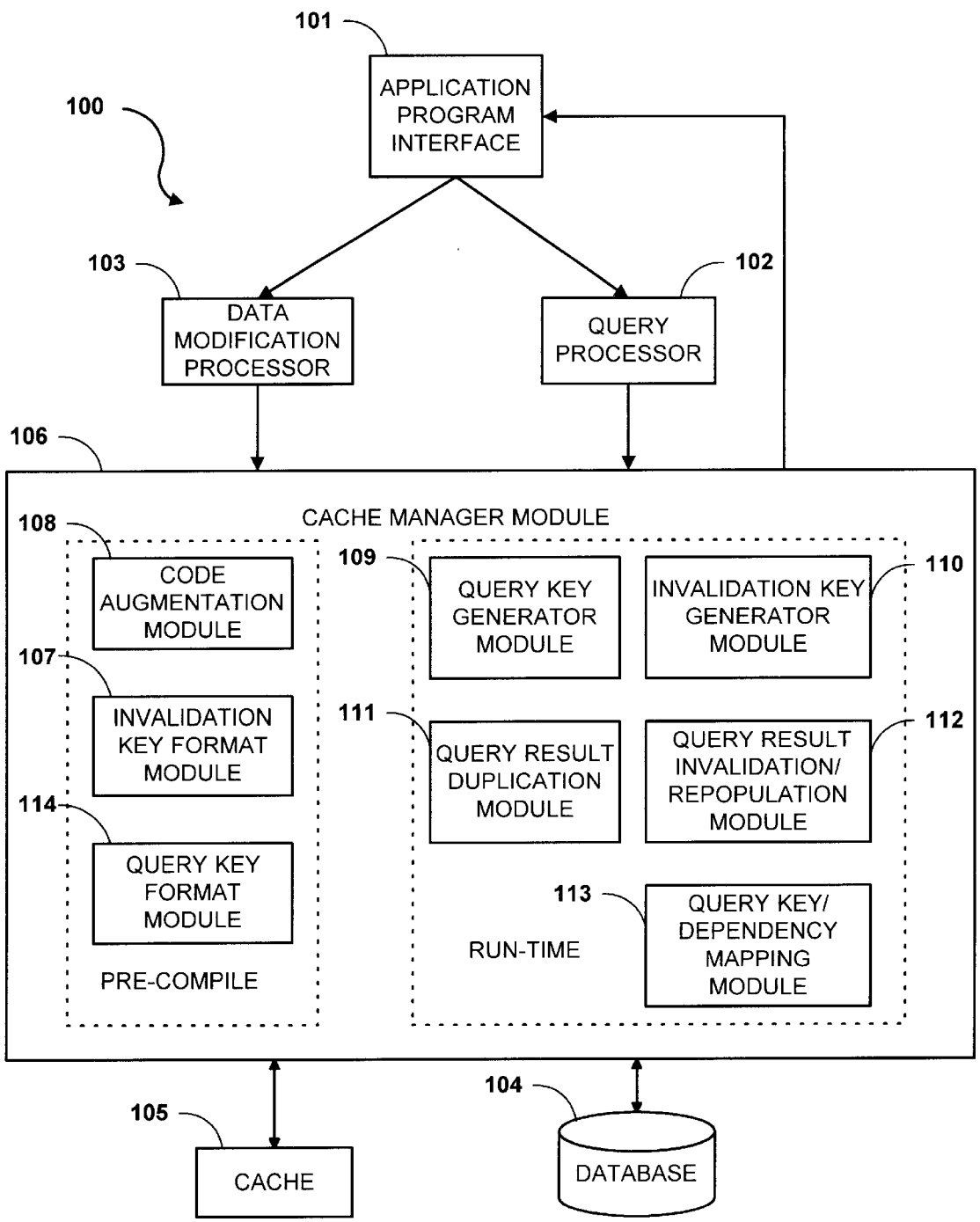
FIG. 1 is a block diagram of a system for managing cachable entities in accordance with an embodiment of the present invention.

Referring now to FIG. 1, a block diagram illustrates a data processing system for managing a cache of query results in accordance with an embodiment of the present invention. It is to be understood that although the system depicted in FIG. 1 illustrates the various modules which may be utilized for implementing the present invention, the various modules may be employed at different times during program execution (e.g., either prior to or at compile time and/or during run-time execution). The data processing system 100 includes an application program interface (API) 101 for providing communication between an outside entity and the system 100. For instance, in a client-server configuration, the API 101 may be implemented as one or more servers each having a suitable application program for processing programmatically-formulated statements thereby allowing, e.g., remote clients to interact with the data processing system 100 over a network. In addition, the API 101 may be a computer monitor utilizing a graphical user interface (GUI) suitable for inputting user-formulated commands and otherwise allowing human-centric type clients to communicate with the system 100, as well as for displaying information, e.g., query results.

A query processor module 102 analyzes program code to detect programmatically-formulated (as well as user-formulated) query statements (which are input via the API 101) during pre-compile time (program analysis execution) and then processes query statements during program execution run-time (as described below in detail). Similarly, during pre-compile time, a modification processor module 103 analyzes program code to detect programmatically-formulated (as well as user-formulated) statements (which are input via the API 101) requesting modification of the data content of database 104, and then processes the code during run-time (as described in detail below) for effecting the requested modification. For purposes of the following description, it is assumed that the database 104 stores all of the relevant data, as well as a plurality of objects which are created from the data and other objects (collectively, referred to as "entities").

The data processing system 100 also includes a cache 105 which is managed by cache manager module 106. The cache 105 is preferably implemented in software (i.e., managed memory, backed by disk) although one skilled in the art may envision other cache implementations depending on the application (e.g., a database cache such as IBM's DB2 database or a processor cache such as the cache in IBM's RS/6000 line of computers). The cache manager module 106 is responsible for managing the cache 105 by, for example, searching for cached query results and automatically invalidating cached query results which are affected due to object and/or data modification.

The cache manager module 106 comprises a plurality of modules, each of which are employed either during pre-compile time or run-time. For example, during pre-compile time, an invalidation key format module 107 generates an invalidation key for each "set", "create" and "delete" statement which is detected (by the data modification processor 103) during program analysis, each invalidation key having a key format based on the detected statement. For each detected "set", "create" and "delete" method, a code augmentation module 108 generates and injects code into the target method, which is subsequently compiled and executed to calculate the key for invalidating dependent cached query results.

A query key format module 114 generates a query key for each "find" statement detected during program analysis, each query key having a key format based on the detected statement. For each detected "find" statement, the code augmentation module 108 generates and injects code into the method, which is subsequently compiled and executed to generate a cache query key for searching the cache 105.

The cache manager module 106 also includes modules which are employed during run-time. For example, after the augmented code injected into a "find" method is compiled, a query key generator module 109 will execute the compiled code to calculate the cache query specific key incorporating run-time query data (attribute values). The cache query keys are employed to insert query results into, and retrieve query results from, the dependency managed cache 105. Similarly, after the augmented code is injected into the "set", "delete" or "create" methods, an invalidation key generator module 110 will execute the compiled code to calculate a specific invalidation key based on the run-time attribute values for invalidating cached query results dependent on the state changes of the attribute values. The invalidation key generator module 110 also produces regularized dependencies which are added to query results stored in the cache 105. These dependencies are used in conjunction with the invalidation keys to invalidate cached query results having the corresponding dependencies.

Other components of the cache manager module 106 which are employed during run-time include a query result duplication module 111, which replicates the query results (for output or further processing) that are either located in cache 105 by the query processor 102 using the calculated query key or generated by the query processor 102 when the cache does not contain corresponding query results. A query key/dependency mapping module 113 operates during runtime to map the relationship between the generated query keys and the regularized dependencies. A query result invalidation/repopulation module 112 operates to invalidate cached query results which are dependent on modified data and/or objects using the invalidation keys and to repopulate invalidated cached query results. Each of the functions of the above system elements will be described in further detail below.

Figure 2:
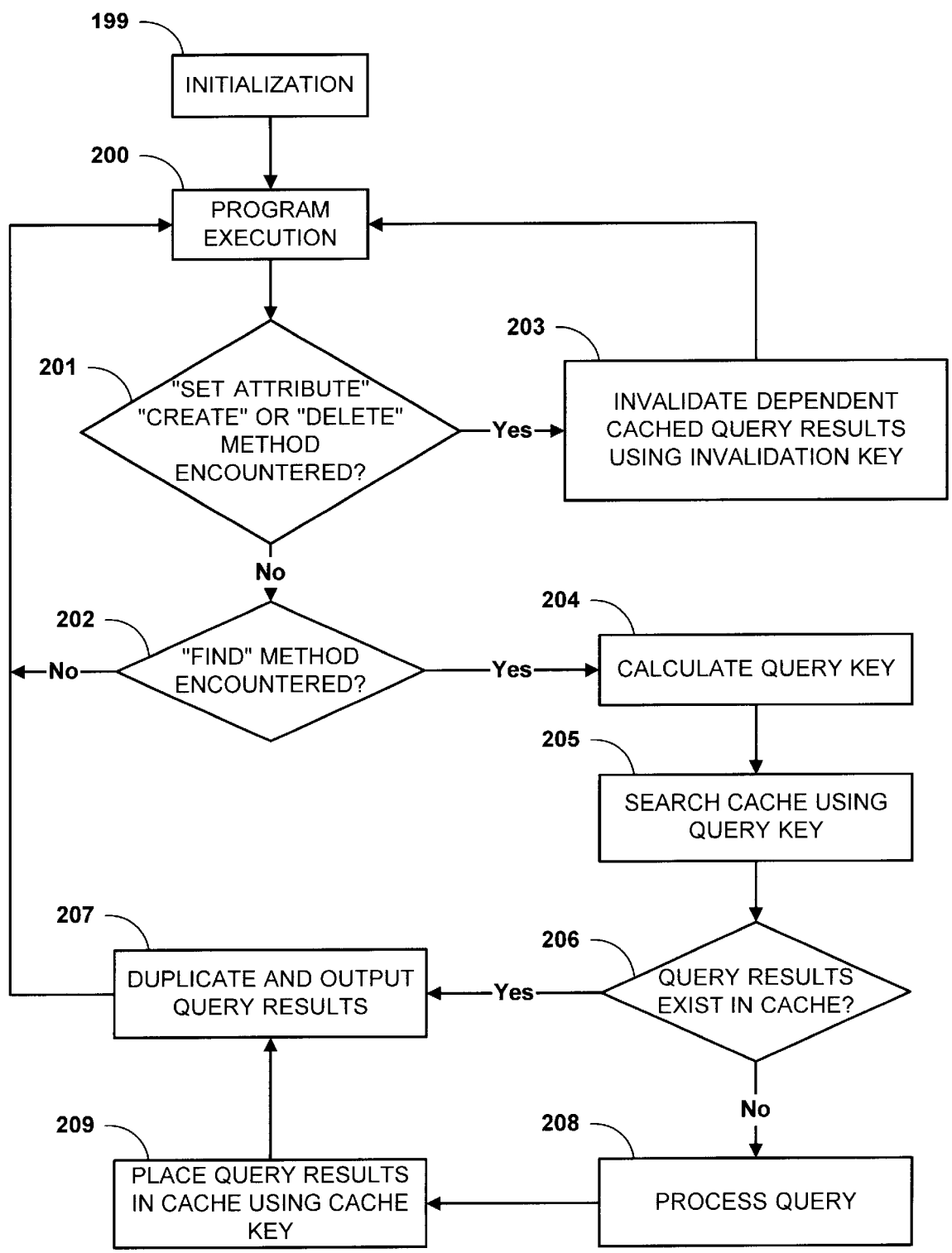
FIG. 2 is a flow diagram of method for managing cachable entities during run-time execution of a data processing application in accordance with one aspect of the present invention.

Referring now to FIG. 2, a flow diagram illustrates method for managing a cache of query results during run-time execution in accordance with one aspect of the present invention. The process begins with program initialization (i.e., initialization of the cache manager module) (step 199) which initializes (repopulates) the cache of query results based upon certain initialization considerations (such as frequently used query results from prior executions, program environment, etc.) The process continues with program execution (step 200) until a "set attribute" or "create" or "delete" operation is encountered (step 201) or a "find" operation is encountered (step 202). If a "set attribute" or "create" or "delete" operation is encountered (affirmative result in step 201), the cache will be searched and dependent cached query results will be invalidated using the corresponding invalidation keys (step 203). In particular, invalidation is performed by discarding query, results, if any, contained in the cache which are dependent on the change in attribute value, or the creation or deletion of an instance of an object. Invalidation may result, for example, in one of the following: (i) a purge from the cache; (ii) a purge from the cache followed by repopulation of the cache; or (iii) updating the cache (e.g., for a delete operation, removing the object from each dependent query result). Once all dependent query results have invalidated, program control returns to normal program execution (return to step 200).

If a "find" operation is encountered (affirmative result in step 202), a query key is calculated (step 204). The query key is utilized for accessing and updating information contained in the cache. The query key is based upon object class, subject attributes of the query, and possibly their associated desired values. The calculated query key is then used to search the cache and locate associated query results in the cache (step 205). A determination is made as to whether query results satisfying the query already exist in the cache (step 206). If it is determined that the cache does contain results for the query (affirmative determination in step 206), the cached query results are duplicated and output for display and/or further processing (step 207). The process of duplicating the cached query results is performed by utilizing the calculated cache key (from step 204) to retrieve the results for the query from the cache and making a copy to provide to the running program.

On the other hand, if it is determined that the cache does not contain results for the query (negative determination in step 206), the original query is processed in normal manner to obtain query results (step 208), absent the efficient cache method described herein. The query results are then stored in the cache using the previously calculated cache key (step 209). The stored query results are then duplicated and output for display and/or further processing (step 207). Program control then returns to normal program execution (step 200).

It is to be understood that prior to run-time execution of the program (as depicted in FIG. 2) whereby the query results are efficiently cached and properly invalidated, a program analysis process must first be performed whereby additional program logic is incorporated into the target application in a methodical, patterned, regularized way.

Figure 3:
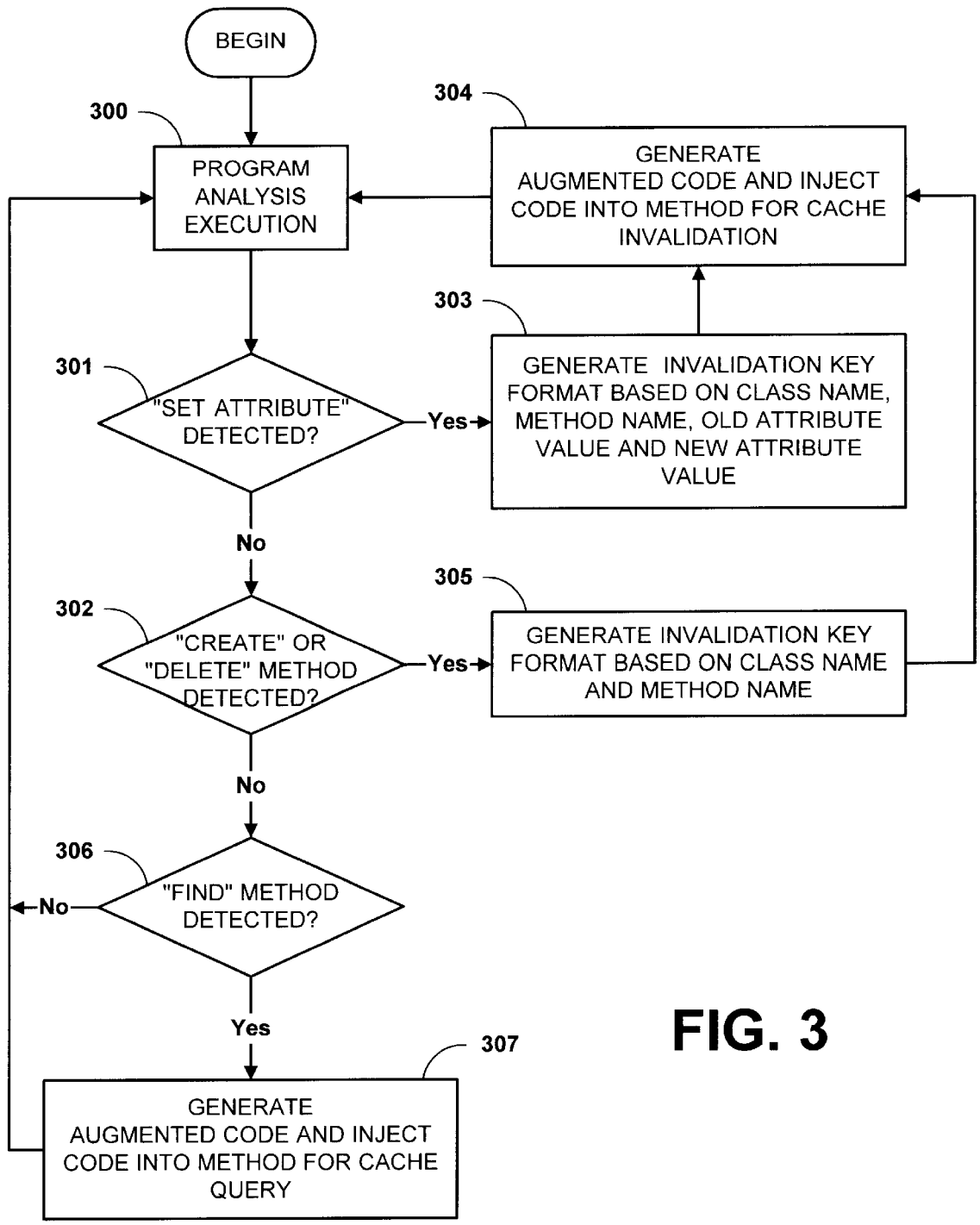
FIG. 3 is a flow diagram of a program analysis process for managing cachable entities in accordance with one aspect of the present invention.

Referring now to FIG. 3, a flow diagram illustrates a program analysis process for managing a cache of query results in accordance with one aspect of the present invention. The process depicted in FIG. 3 will be referred herein as the ALPACA (automated logical program analysis and code augmentation) process. The ALPACA process begins with program analysis execution (step 300) until a "set attribute" method is detected (step 301), a "create" or "delete" method is detected (step 302), or until a "find" method is detected (step 306), until all relevant statements have been scrutinized, at which time the code is compiled. It is to be understood that the present invention may be configured to detect statements in the form of source code, assembly code, machine code, and structured query language (SQL) code.

When a "set attribute" method is detected (affirmative determination in step 301), program analysis control flows to generate code for generating an invalidation key (via the invalidation key format module 107, FIG. 1), which may be structured in accordance with the class name and method name of the subject attribute, together with the present and future values of the subject attribute (303). It is to be understood that the invalidation key which is generated for a "set attribute" method is partially static because values of the invalidation key such as the class name and the attribute name are known at compile time, and partially dynamic since the values such as the previous attribute value and a new attribute value are only known during run-time execution after the code is compiled. After the invalidation key format is generated, augmented program code for calculating the invalidation key is generated and injected into the "set attribute" method (step 304) (via the code augmentation module 108, FIG. 1). As discussed above, the augmented code is subsequently compiled and executed to calculate the invalidation key during run-time execution for cache invalidation (i.e., step 203, FIG. 2). Control then returns to continue program analysis (return to step 300) until the entire relevant portions of the program have been examined, at which time the code is compiled.

When a "create" or "delete" method is detected (affirmative determination in step 302), program analysis control flows to generate code for generating an invalidation key (via the invalidation key format module 107, FIG. 1) which may be structured in accordance with the class name and method name of the subject operation together with the present and/or future value(s) of all applicable subject object attributes (step 305). It is to be understood that the invalidation key which is generated for a "create" or "delete" method is partially static because values of the invalidation key such as the class name and the method name are known at compile time, and partially dynamic since the previous (when deleting) and new (when creating) attribute values are only known during run-time execution after the code is compiled. After the invalidation key format is generated, augmented code for calculating the invalidation key is generated and injected into the "create" and "delete" methods (step 304) (via the code augmentation module 108, FIG. 1). As discussed above, the augmented code is subsequently compiled and executed to calculate the invalidation key during run-time for cache invalidation (i.e., step 203, FIG. 2). Control then returns to continue program analysis (return to step 300) until the entire relevant portions of the program have been examined, at which time the code is then compiled.

It is to be appreciated that the invalidation keys are used to locate any cached query results which are dependent upon attribute state changes, where the term "dependent" refers to a change in the query results with respect to the result of the create, delete, or set operation in progress.

When a "find" method is detected (affirmative determination in step 306), program analysis control flows to generate code and inject the code into the "find" method (step 307) which is subsequently complied and executed during run-time for calculating the query specific key in accordance with class and method name, the evaluation method, and the query data (i.e., step 204, FIG. 2). After the "find" method code is augmented, control returns to continue program analysis (step 300) until the entire relevant portions of the program have been examined, at which time the code is compiled.

The ALPACA method of FIG. 3 will now be explained in further detail with reference to the blocks of exemplary program code illustrated below.

By way of example, the following block of program code illustrates original programmer supplied source code that represents some portion of an implementation of an object where it is expected that all attribute state changes occur through a "set attribute" method having a patterned signature:

```
void class A::attribute1(string sVal){/*"set attribute1"*/ iDataObject->attribute1(sVal);

}                                                        (1)
```

Briefly, the "set attribute" pattern recognized in the above program code is as follows: the method returns void; the class name and method name are separated by ::; and exactly one parameter is passed into the method specifying the new value for the attribute. It is to be understood that other recurring patterns designated as "set attribute" methods are possible and even likely.

The following block of program code illustrates code augmentation of the above "set attribute" method for invalidating cached query results based on attribute state modification in accordance with one aspect of the present invention:

```
void class A::attribute1(string sVal){/* "set attribute1"*/ string_var sVarOld=classA::attribute1( );

string_var sVarNew=duplicate(sVal);

qCache::invalidate("set", "classA", "attribute1",sVarOld,SVar-
        New);

iDataObject->attribute1(sVal);

}                                                        (1a)
```

As shown, the original programmer supplied source code is augmented with additional code (shown in italics) in accordance with step 304 of FIG. 3 in order to invalidate cached queries dependent upon attribute state changes (step 203 of FIG. 2). Specifically, during the ALPACA process (FIG. 3), each method signature is examined to determine whether or not it is a "set attribute" method. The sample block of program code (1) has such a signature and, consequently, the ALPACA process generates updated program code for the "set attribute" method, which results in the updated program code block (1a). These changes are then compiled into the program. Subsequently, during run-time execution, the newly injected code will cause invalidation of query results from the cache which become stale due to the subject "set attribute" state change occurrence. As indicated above, invalidation may result, for example, in one of the following: (i) a purge from the cache; (ii) a purge from the cache followed by repopulation of the cache; or (iii) updating the cache.

To "update" the cache, further information would be necessary for qCache::invalidate, namely, a reference to the changed object itself, so that the object could be added/removed from the cached queries as appropriate.

Next, the following exemplary program code block illustrates original programmer supplied source code that represents some portion of an implementation of an object where it is expected that all requests to create or delete objects of a subject class are made through a "create" and a "delete" method, respectively, each having a patterned signature:

```
classA::object classAHome::create() {                    (2)
    classA::object target = iDataObject->create();
    return(target);
} void classAHome::delete(classA::object target) {         (3)
    iDataObject->delete(target);
}
```

Briefly, the "create" pattern recognized in this sample is as follows: the method returns a value which is the representation of the newly created object; the class name and method name are separated by :: ; the class name contains the string "Home" and a string representing the subject class; the method name contains the string "create"; and no parameters are passed into the method. It is to be appreciated that other recurring patterns designated as "create" methods are possible and even likely.

Similarly, the "delete" pattern recognized in this sample is as follows: the method returns void; the class name and method name are separated by :: ; the class name contains the string "Home" and a string representing the subject class; the method name contains the string "delete"; and exactly one parameter is passed into the method specifying the object to be deleted. It is to be appreciated that other recurring patterns designated as "delete" methods are possible and even likely.

The following blocks of program code illustrate code augmentation for invalidating cached query results based on object creation and object deletion, respectively, in accordance with one aspect of the present invention:

```
classA::object classAHome::create() {                    (2a)
    qCache::invalidate("create", "classA", "", "", "");
    classA::object target = iDataObject->create();
    return(target);
} void classAHome::delete(classA::object target) {         (3a)
    qCache::invalidate("delete", "classA", "", "", "");
    iDataObject->delete(target);
}
```

As shown, the original programmer supplied source code is augmented with additional code (shown in italics) in accordance with step 304 of FIG. 3 in order to invalidate cached queries dependent upon object creation and deletion changes (step 203 of FIG. 2). Specifically, during the ALPACA process, each method signature is examined to determine whether or not it is a either a "create" method or a "delete" method. In the above sample blocks of program code (2) and (3), exactly one of each occurs and, consequently, the ALPACA process generates updated program code for the "create" and "delete" methods, which results in the updated program code blocks (2a) and (3a), respectively. These changes are then compiled into the program. Subsequently, during run-time, execution of the newly injected code will cause invalidation of query results from the cache which become stale due to subject "create" or "delete" state change occurrence. Again, invalidation may result, for example, in one of the following: (i) a purge from the cache; (ii) a purge from the cache followed by repopulation of the cache; or (iii) updating the cache.

To "update" the cache, further information would be necessary for qCache::invalidate, namely, a reference to the created/deleted object itself, so that the object could be added/removed from the cached queries as appropriate.

Next, the following exemplary blocks of program code illustrate original programmer supplied source code which represents some portion of an implementation of an object where it is expected that all queries to locate objects or sets of objects are made through "find" methods having both a patterned signature and a patterned "object query technique":

```
classA::object[] classAHome::findByAttribute1(string al){            (4)
    classA::object[] retVal;
    string_var sQuery = "attribute 1 ==" + al;
    retVal = iDataObject->eval(sQuery);
    return(retVal);
} classA::object[] classAHome::findbyAttribute2(int a2) {              (5)
    classA::object[] retVal;
    string_var sQuery = "attribute2 ==" + intToString(a2);
    retVal = iDataObject->eval(sQuery);
    return (retVal);
} classA::object[] classAHome::findByAttribute3(classB::object         (6)
a3) {
    classA::object[] retVal;
    string_var sQuery = "attribute3 ==" + objectTold(a3);
    retVal = iDataObject->eval(sQuery);
    return(retVal);
} classA::object[]                                                     (7)
classAHome::findByAttribute1AndAttribute2(string a1, int a2) {
    classA::object[] retVal;
    string_var sQ1 = "attribute 1 ==" + a1;
    string_var sQ2 = "attribute2 ==" + intToString(a2);
    string_var sQuery = sQ1 + "AND"+ sQ2;
    retVal = iDataObject->eval(sQuery);
    return(retVal);
} classA::object[] classAHome::findByAttribute1OrAttribute2(string     (8)
a1, int a2) {
    classA::object[] retVal;
    string_var sQ1 = "attribute1 ==" + a1;
    string_var sQ2 = "attribute2 ==" + intToString(a2);
    string_var sQuery = sQ1 + "OR"+ sQ2;
    retVal = iDataObject->eval(sQuery);
    return(retVal);
}
```

Briefly, the "find" pattern recognized in each of these samples is as follows: the method returns a value which is the representation of a collection of objects of the subject class; the class name and method name are separated by ::; the class name contains the string "Home" and a string representing the subject class; the method name contains the string "find", and the code body contains an object query method invocation expecting exactly one parameter which is a string representing the query to be performed. It is to be appreciated that other recurring patterns designated as "find" methods are possible and even likely.

Briefly, the "object query technique" pattern recognized in each of these samples is as follows: the method invocation of interest is contained within the body of a "find" method code body; the method invocation of interest returns a value that matches that returned by the "find" method itself; the method invocation of interest takes exactly one parameter which is a string representing the query to be performed. It is to be appreciated that other recurring patterns designated as "object query technique" methods are possible and even likely.

The following blocks of program code illustrate code augmentation for each of the above "find" methods, respectively, for searching a cache of query results in accordance with one aspect of the present invention:

```
classA::object[] classAHome::findByAttribute1(string a1){            (4a)
    classA::object[] retVal;
    string_var sQuery = "attribute 1 ==" + a1;
    string_var sName = "classAHome::findByAttribute1";
    retVal= (classA::object[])qCache::lookup(sName, iDataObject,
    "eval ",sQuery);
    return(retVal);
} classA::object[] classAHome::findbyAttribute2(int a2) {              (5a)
    classA::object[] retVal;
    string_var sQuery = "attribute2 ==" + intToString(a2);
    string_var Sname = "classAHome::findByAttribute2";
    retVal= (classA::object[])qCache::lookup(sName, iDataObject,
    "eval ", sQuery);
    return (retVal);
} classA::object[] classAHome::findByAttribute3(classB::objecta3) {    (6a)
    classA::object[] retVal;
    string_var sQuery = "attribute3 ==" + objectTold(a3);
    string_var sName = "classAHome::findByAttribute3";
    retVal = (classA::object[])qCache::lookup(sName, iDataObject,
    "eval ",sQuery);
    return(retVal);
} classA::object[]                                                     (7a)
classAHome::findByAttribute1AndAttribute2(string a1, int a2) {
    classA::object[] retVal;
    string_var sQ1 = "attribute 1 ==" + a1;
    string_var sQ2 = "attribute2 ==" + intToString(a2);
    string_var sQuery = sQ1 + "AND" + sQ2;
    string_var sName = "classAHome::findByAttribute1AndAttribute2";
    retVal = (classA::object[])qCache::lookup(sName, iDataObject,
    "eval",sQuery);
    return(retval);
} classA::object[] classAHome::findByAttribute1OrAttribute2(string     (8a)
a1, int a2) {
    classA::object retVal;
    string_var sQ1 = "attribute1 ==" + a1;
    string_var sQ2 = "attribute2 ==" + intToString(a2);
    string_var sQuery = sQ1 + "OR" + sQ2;
    string_var sName = "classAHome:findByAttribute1OrAttribute2";
    retVal = (classA::object[])qCache::lookup(sName, iDataObject, "eval",
    sQuery);
    return(retVal);
}
```

As shown in each of the blocks of program code, the original programmer supplied source code is augmented with additional code (shown in italics) in accordance with step 307 of FIG. 3 in order to search cached query results (in accordance with step 205 of FIG. 2). Specifically, during the ALPACA process, the original programmer supplied blocks of source code (4)–(8) are transformed into cached query enabled code blocks (4a)–(8a), respectively, which is compiled into the program. At run-time, each cached query request is carried out according to steps 204–209 of FIG. 2.

Figure 4:
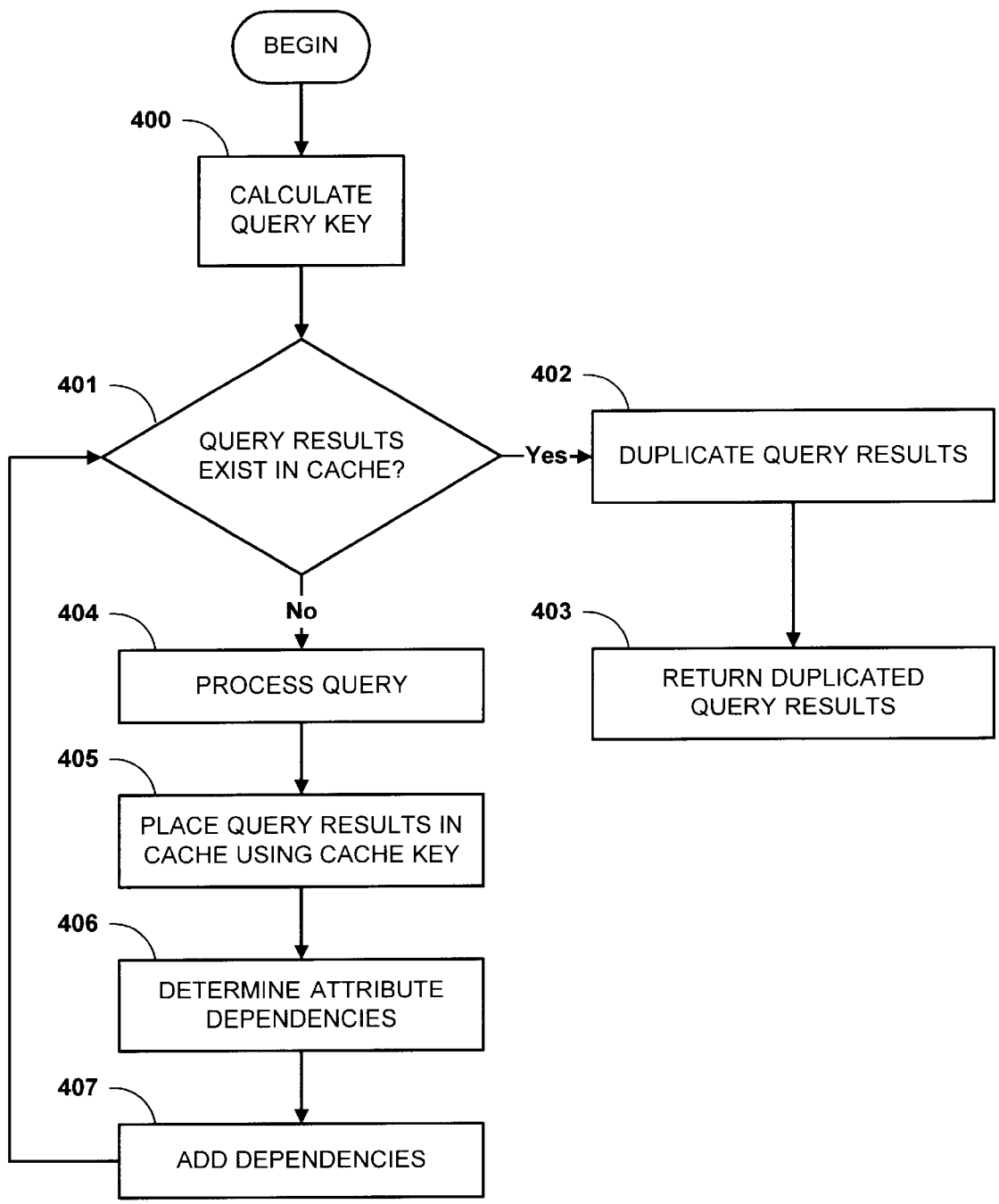
FIG. 4 is a flow diagram of a method for processing a query utilizing cached query results in accordance with one aspect of the present invention.

By way of example, the run-time process of qCache::lookup for the above-illustrated augmented program block (7a) will now be described in further detail with reference to the method depicted in the flow diagram of FIG. 4. Initially, a cache key is calculated (step 400) partly based upon the query at hand. For this example, assume that the query at hand, specifically the run-time value of sQuery, is the following Object-Oriented Structure Query Language (OOSQL)-like statement:

"attribute1 LIKE <a1Value>AND attribute2 LIKE<a2Value>";

where <a1Value> and <a2Value> represent the actual values (in stringified form) of a1value and a2Value, respectively. Assume further that the calculated cache key is the fully qualified method name:

"classAHome::findByAttribute1AndAttribute2"

concatenated with ":=" followed by the run-time value of sQuery. In this example, the resulting cache key is:

"classAHome::findByAttribute1AndAttribute2:=attribute1 LIKE <a1Value>AND attribute2 LIKE <a2Value>".

The calculated cache key (from step 400) is used to interrogate the cache (step 401) in order to make the determination as to whether or not the corresponding query result for this particular method invocation of classAHome::findByAttribute1andAttribute2 already exists in the cache.

If it is determined that the cache does contain results for the query (affirmative result in step 401), the program flows directly to replicate cached results (step 402). Next, the replicated results are returned (step 403) and the processing for this query is complete. On the other hand, if it is determined that the cache does not contain results for the query (negative determination in step 401), the program flows to obtain the results based upon the original query iDataObject–>eval(sQuery) (step 404) in the standard manner, absent the efficient cache described herein. The query results obtained are then placed into the cache (step 405) using the calculated cache key (from step 400).

Program control then proceeds to determine attribute dependencies (step 406). Specifically, the attribute dependencies are determined by examining the query at hand and locating attribute references. By way of the above example, the recognized attributes from sQuery are "attribute1" and "attribute2", and <a1value>and <a2Value>are their respective corresponding values in stringified form. This information is used to add dependencies (step 407) to the newly cached query results (that were stored in the cache step 405). These dependencies are referenced whenever one of the following events occur:

classA::attribute1(sVal);

classA::attribute2(sVal);

classAHome::create( ); or classAHome::delete(target);

and the cache is updated appropriately, as necessary. Once the dependencies have been added, program flow then continues at (step 401).

In accordance with the present invention, the following set of query keys (q1–q5) and set of dependencies (d1–d5) are examples of what might ultimately be produced subsequent to at least one invocation of each qCache::lookup method in the above sample program code blocks (4a)–(8a) given the parameters string a1Value, int a2Value, and classB::object a3Value, as appropriate:

q1=ClassAHome::findByAttribute1:=attribute1 LIKE <a1Value>;

q2=ClassAHome::findByAttribute2:=attribute2 LIKE <a2Value>;

q3=ClassAHome::findByAttribute3:=attribute3 LIKE <a3Value>;

q4=classAHome::findByAttribute1AndAttribute2:=attribute1 LIKE <a1Value>AND attribute2 LIKE <a2Value>; and q5=classAHome::findByAttribute1OrAttribute2:=attribute1 LIKE <a1Value>OR attribute2 LIKE <a2Value>;

d1=classA::attribute1:=<a1Value>;

d2=classA::attribute2:=<a2Value>;

d3=classA::attribute3:=<a3Value>;

d4=classA::create; and d5=classA::delete.

Figure 5:
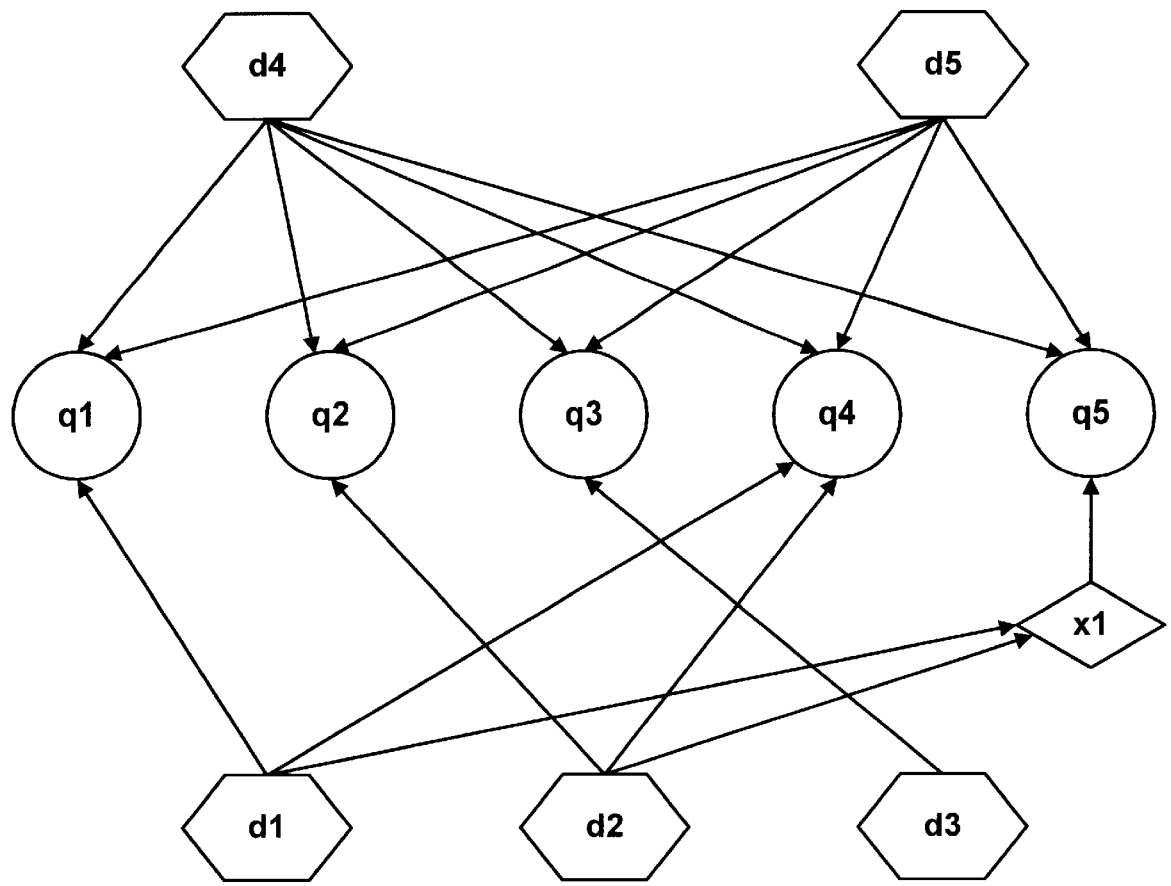
FIG. 5 is an object dependence graph in accordance with one aspect of the present invention.

Referring now to FIG. 5, a diagram illustrates an object dependence graph showing the relationships between the query keys (q1–q5), each representing a specific query result, and the qcache::lookup manufactured dependencies (d1–d5). These relationships are referred to whenever a "set attribute", "create", or "delete" method occurs in order to update the cache in accordance with the teachings herein, as necessary. As illustrated in FIG. 5, the dependencies for q1 are d1, d4, and d5 (or, referring to the above illustrated query keys and dependencies, the cached query result for "attribute1 LIKE <a1Value>" potentially becomes invalid only whenever classA::attribute1(sVal), or classA::create( ), or classA::delete( ) method is invoked). It is to be understood that the dependencies are generated by program analysis as described above in step 407 of FIG. 4.

Thus, continuing the above example, if an instance of a classA object has its attribute1 value change from a1Value to some other value, say b1value, because of classA::attribute1 (b1Value), then the object dependence graph is consulted to determine that query results q1 and q4, which depend on dependency d1, must be at least flushed from the cache (whereas q5, which also depends on d1, may or may not be flushed from the cache due to x1 as discussed below). The cache might be repopulated with adjusted q1 and q4 results, depending upon various run-time factors.

Similarly, if an instance of a classA object is deleted because of classAHome::delete(target), then the object dependence graph is consulted to determine that query results q1, q2, q3, q4, and q5, which depend on dependency d5, might need to be flushed from the cache, depending upon the attribute values of the deleted target object. The cache might be repopulated with adjusted query results, depending upon various run-time factors.

Furthermore, with respect to q5, if an instance of a classA object has both its attribute1 and/or attribute2 values change to some other values, say c1Value and/or c2Value respectively, because of classA::attribute1(c1Value) and/or classA::attribute2(c2Value), then the object dependence graph is consulted to determine if query result q5, which depends on dependency d1 AND dependency d2 together, as shown by x1, must be flushed from the cache. It is to be understood that other query results (e.g., q1, q2, q3 and/or q4) may be flushed/repopulated independent of what occurs to the q5 cached query result.

In the case where only attribute1 changed to c1Value (presuming c1Value does not qualify the object for the query result) and the value of unchanged attribute2 continues to qualify the query result, the cache remains unchanged with respect to q5. However, other query results may be flushed/repopulated. Similarly, in the case where only attribute2 changed to value c2Value (presuming c2Value does not qualify the object for the query result) and the value of unchanged attribute1 continues to qualify the query result, the cache remains unchanged with respect to q5. Again, other query results may be flushed/repopulated. But in the case where both attribute1 and attribute2 change, and then neither qualifies the object for the query result, then the query result is flushed from the cache. The cache might be repopulated with adjusted query results, depending upon various run-time factors.

It is to be understood that although the above examples illustrate a particular way to handle "and" and "or" operations with respect to the query results cache, one of ordinary skill in the art may envision other variations on how to handle these particular operations, as well as other operations and combinations of operations.

In addition, it is to be appreciated by one skilled in the art that when a cached query result is found to be obsolete, it is sometimes possible and/or desirable to update the cache (as noted above) instead of invalidating/repopulating the cache. For example, assume an object is deleted. Ordinarily, a particular query result would be purged from the cache, and the cache may be repopulated with the new result for that query. Updating the cache is an alternative possibility, whereby the deleted object can be removed from the query result in the cache. Similarly, for a create method, the newly created object could be added to the appropriate query results.

It is to be appreciated that other techniques for maintaining dependency relationships between cached entities and underlying data may be employed in the present invention. In addition, a more generalized method which may be employed for maintaining dependency relationships is the data update propagation (DUP) method described in U.S. Pat. No. 6,026,413, issued on Feb. 15, 2000, entitled: "Determining How Changes to Underlying Data Affect Cached Objects," which is commonly assigned and incorporated herein by reference. This method may be employed to determine how changes to underlying data affect cached query results in conjunction with the present invention. The DUP algorithm (which is also disclosed in "A Scalable System for Consistently Caching Dynamic Web Data" by J. Challenger, A. Iyengar, and P. Dantzig in Proceedings of IEEE INFOCOM'99, March, 1999), is a method for identifying cached entities which become stale as a result of changes to underlying data on which the cached entities depend, such as databases. This method allows stale cached entities to be either invalidated or updated directly in the cache without having to first perform invalidation. For instance, the DUP algorithm may be employed to identify cached objects affected by database changes, whereby the DUP algorithm maintains correspondences between objects (which are defined in the cited references as items which may be cached) and underlying data, which correspond to parts of the database.

It is to be further understood that the present invention is not restricted to the specific types of query results described above and that a variety of different entities (other than query results) may be cached and managed in accordance with the teachings herein. Moreover, notwithstanding that the above illustrative embodiments discuss how program analysis can applied to make decisions about caching and invalidating queries, one of ordinary skill in the art can envision a variety of implementations utilizing program analysis to assist in performing cache transactions.

Figure 6:
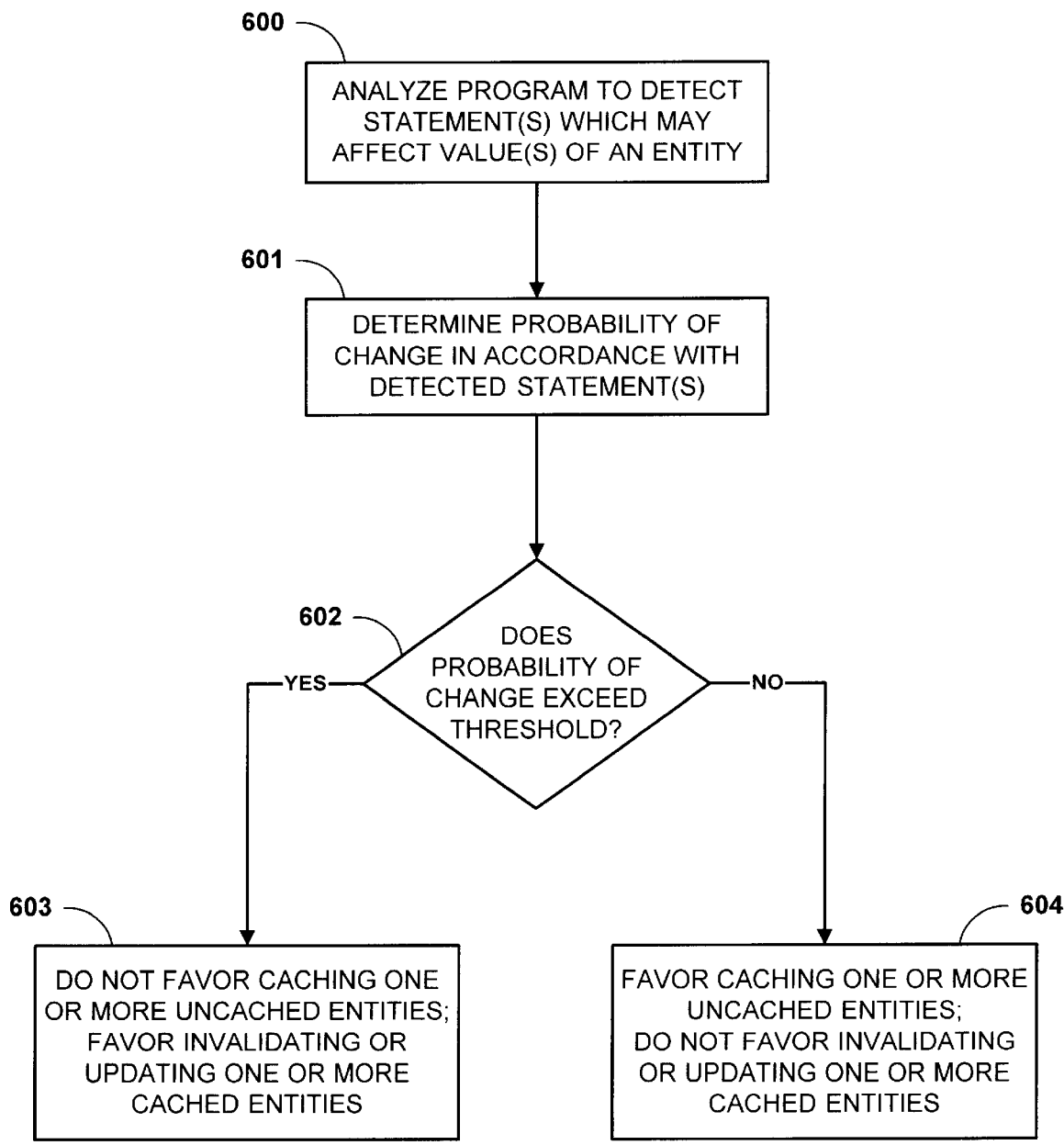
FIG. 6 is a flow diagram of a general method for managing cachable entities in accordance with another aspect of the present invention.

For example, referring to FIG. 6, a flow diagram illustrates a method for managing cachable entities in accordance with an embodiment of the present invention. It is to be understood that the flow diagram of FIG. 6 represents a general approach for using program analysis for aiding in making cache decisions (and that the above illustrative embodiments are particular examples of the methodology embodied in FIG. 6). With this method, a program is analyzed to identify or otherwise detect one or more statements (if they exist) which may modify a value of one or more cachable entities (e.g., an object, image file, webpage, etc.) during run-time (step 600). For each of the detected statements (if any), a probability is determined which represents the likelihood that the detected statements will be executed (i.e., the likelihood that one or more cachable entities will change due to execution of the statements) (step 601). For example, if a statement is executed outside of a conditional branch in a program, the probability that the statement will execute is often 1. If, on the other hand, a statement executes within a conditional branch (e.g., if (y>0) then x=a*b) the probability that the statement will execute can often be determined from program analysis. In the previous example, the compiler might have determined through analysis that "y" is extremely likely to be positive. If so, it would conclude that x has a high probability of changing.

To determine if a cache transaction will be performed (e.g., inserting an object in cache or deleting or updating a cached object), a determination is made as to whether the probability of change (of one or more entities) meets a predefined threshold (step 602). If it is determined that the likelihood of change exceeds the threshold (affirmative determination in step 602), the system may be in favor of not caching one or more uncached entities and/or be in favor of invalidating or updating one or more cached entities (step 603). On the other hand, if it is determined that the likelihood of change does not exceed the threshold (negative determination in step 602), the system may be in favor of caching one or more uncached entities and/or not be in favor of invalidating or updating one or more cached entities (step 604).

It is to be appreciated that the process depicted in FIG. 6, may be slightly modified to provide another method for managing cachable entities in accordance with the present invention. In particular, one or more statements may be added to the program (in step 600), some of which being utilized to determine the likelihood of change. In this method, step 601 would be performed when the program executes.

It is to be understood that there are a number of extensions and generalizations to the method depicted in FIG. 6. For instance, the method just described uses program analysis to calculate the desirability of, e.g., caching an entity based on its expected lifetime. It is possible to use program analysis for calculating the desirability of caching an entity based on other criteria such as cost to fetch or materialize, expected frequency of access, and size. For example, the method can be adapted to favor caching objects which are expensive to fetch or materialize over objects which are less expensive to fetch or materialize. In order to accomplish this, the program analysis (in step 600) could be implemented to identify or otherwise detect one or more statements which materialize or fetch a value of one or more entities. Then, a cost for materializing or fetching one or more entities may be estimated (in step 601) based on the one or more detected statements. Then, a determination can be made (in step 602) as to whether the estimated cost exceeds a threshold. If so, then the system would favor caching the entities (in step 604). If not, then the system would favor not caching the entities (in step 603).

A more sophisticated implementation of step 602 would consider several factors in making caching decisions including but not limited to access frequency, size, cost for materializing or fetching, and lifetime. An exemplary embodiment of such an implementation is described in U.S. patent application Ser. No. 08/958,506, entitled: "A New Algorithm for Cache Replacement", filed on Oct. 27, 1997 and commonly assigned.

It is to be further appreciated that the methods discussed herein may be utilized in conjunction with cache replacement algorithms. Cache replacement algorithms are used to determine which entities should be excluded from a cache when the cache contains insufficient space to store all entities. Several references on cache replacement algorithms exist in the literature including "Cost-Aware WWW Proxy Caching Algorithms" by Pei Cao and Sandy Irani, Proceedings of USITS '97, Monterey, Calif., December 1997.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for managing a plurality of cachable entities, comprising the steps of:

analyzing program code to determine if there is at least one statement which may affect a desirability of performing at least one cache transaction, wherein the at least one statement is a statement that modifies a value of at least one cachable entity, and wherein the desirability is based on an expected lifetime of the at least one cachable entity;

determining the desirability of performing the at least one cache transaction based on a probability that the at least one statement will execute; and performing the at least one cache transaction if said desirability is greater than or equal to a threshold.

2. The method of claim 1, wherein the desirability of performing the at least one cache transaction is based on one of a frequency of access of at least one cachable entity, a size of at least one cachable entity, a time to one of fetch and materialize at least one cachable entity, a lifetime of at least one cachable entity, and a combination thereof.

3. The method of claim 1, wherein the step of performing at least one cache transaction comprises one of storing at least one cachable entity in a cache, invalidating at least one cachable entity stored in a cache, updating at least one cachable entity stored in a cache, and a combination thereof.

4. The method of claim 1, further comprising the step of augmenting the program code with additional code to assist in determining the desirability of performing the at least one cache transaction.

5. The method of claim 1, further comprising the step of augmenting the program code with additional code to perform the at least one cache transaction.

6. The method of claim 3, wherein at least one of the step of invalidating the at least one cachable entity stored in the cache and the step of updating the at least one cachable entity stored in the cache comprise the step of performing data update propagation (DUP).

7. The method of claim 1, wherein the at least one statement is one of source code, assembly code, machine code, and structured query language (SQL) code.

8. The method of claim 7, wherein the at least one statement in the SQL code includes at least one SET statement.

9. The method of claim 1, wherein the cachable entities include query results.

10. The method of claim 1, wherein the analyzing step comprises the steps of:

detecting at least one query statement for retrieving at least one of the cachable entities from a cache;

generating a query key format; and augmenting the program code with additional code for calculating a query key in accordance with the query key format.

11. The method of claim 10, wherein the step of performing at least one cache transaction comprises the steps of:

executing the augmented code to calculate the query key;

searching the cache using the query key; and retrieving at least one cachable entity stored in the cache if the cachable entity corresponds to the query key.

12. The method of claim 11, further comprising the steps of:

processing the at least one query statement to retrieve at least one of the plurality of cachable entities, if there are no cachable entities in the cache which correspond to the query key;

storing the at least one retrieved cachable entity in the cache using the query key; and associating at least one dependency with the at least one retrieved cachable entity.

13. The method of claim 1, wherein the at least one statement is a type that one of creates at least one cachable entity, deletes at least one cachable entity, and modifies a value of at least one cachable entity, wherein the analyzing step comprises the steps of:

generating an invalidation key format in accordance with the type of the at least one statement; and augmenting the program code with additional code for calculating an invalidation key in accordance with the generated invalidation key format.

14. The method of claim 13, wherein the step of performing at least one cache transaction comprises the steps of:

executing the augmented code to calculate the invalidation key; and invalidating at least one cachable entity stored in the cache that corresponds to the invalidation key.

15. The method of claim 14, wherein the step of invalidating at least one cachable entity comprises one of purging the cachable entity from the cache, purging the cachable entity from the cache and repopulating the cache, and updating the cache.

16. The method of claim 1, wherein the step of performing at least one cache transaction comprises the step of initializing a cache.

17. A program storage device readable by a machine, tangibly embodying a program of instructions executable by the machine to perform method steps for managing a plurality of cachable entities, the method steps comprising:

analyzing program code to determine if there is at least one statement which may affect a desirability of performing at least one cache transaction, wherein the at least one statement is a statement that modifies a value of at least one cachable entity, and wherein the desirability is based on an expected lifetime of the at least one cachable entity;

determining the desirability of performing the at least one cache transaction based on a probability that the at least one statement will execute; and performing the at least one cache transaction if said desirability is greater than or equal to a threshold.

18. The program storage device of claim 17, wherein the desirability of performing the at least one cache transaction is based on one of a frequency of access of at least one cachable entity, a size of at least one cachable entity, a time to one of fetch and materialize at least one cachable entity, a lifetime of at least one cachable entity, and a combination thereof.

19. The program storage device of claim 17, wherein the instructions for performing at least one cache transaction include instructions for one of storing at least one cachable entity in a cache, invalidating at least one cachable entity stored in a cache, updating at least one cachable entity stored in a cache, and a combination thereof.

20. The program storage device claim 17, further including instructions for augmenting the program code with additional code to assist in determining the desirability of performing the at least one cache transaction.

21. The program storage device of claim 17, further including instructions for augmenting the program code with additional code to perform the at least one cache transaction.

22. The program storage device of claim 21, wherein the instructions for at least one of invalidating the at least one cachable entity stored in the cache and updating the at least one cachable entity stored in the cache include instructions for performing data update propagation (DUP).

23. The program storage device of claim 17, wherein the at least one statement is one of source code, assembly code, machine code, and structured query language (SQL) code.

24. The program storage device of claim 23, wherein the at least one statement in the SQL code includes at least one SET statement.

25. The program storage device of claim 17, wherein the cachable entities include query results.

26. The program storage device of claim 17, wherein the instruction for performing the analyzing step include instructions for performing the steps of:
detecting at least one query statement for retrieving at least one of the cachable entities from a cache;
generating a query key format; and
augmenting the program code with additional code for calculating a query key in accordance with the query key format.

27. The program storage device of claim 26, wherein the instructions for performing at least one cache transaction include instructions for performing the steps of:
executing the augmented code to calculate the query key;
searching the cache using the query key; and
retrieving at least one cachable entity stored in the cache if the cachable entity corresponds to the query key.

28. The program storage device of claim 27, further including instructions for performing the steps of:
processing the at least one query statement to retrieve at least one of the plurality of cachable entities, if there are no cachable entities in the cache which correspond to the query key;
storing the at least one retrieved cachable entity in the cache using the query key; and
associating at least one dependency with the at least one retrieved cachable entity.

29. The program storage device of claim 17, wherein the at least one statement is a type that one of creates at least one cachable entity, deletes at least one cachable entity, and modifies a value of at least one cachable entity, wherein the instructions for performing the analyzing step include instructions for performing the steps of:
generating an invalidation key format in accordance with the type of the at least one statement; and
augmenting the program code with additional code for calculating an invalidation key in accordance with the generated invalidation key format.

30. The program storage device of claim 29, wherein the instructions for performing the at least one cache transaction include instructions for performing the steps of:
executing the augmented code to calculate the invalidation key; and
invalidating at least one cachable entity stored in the cache that corresponds to the invalidation key.

31. The program storage device of claim 30, wherein the instructions for invalidating at least one cachable entity include instructions for performing one of purging the cachable entity from the cache, purging the cachable entity from the cache and repopulating the cache, and updating the cache.

32. The program storage device of claim 17, wherein the instructions for performing the at least one cache transaction include instructions for initializing a cache.

33. A system for managing a plurality of cachable entities, comprising:
a program analyzer to analyze program code and determine if there is at least one statement which may affect a desirability of performing at least one cache transaction, wherein the at least one detected statement is a statement that modifies a value of at least one cachable entity, and wherein the desirability is based on an expected lifetime of the at least one cachable entity,
the program analyzer determining the desirability of performing the at least one cache transaction based on a probability that the at least one statement will execute; and
a cache manager for performing the at least one cache transaction if said desirability is greater than or equal to a threshold.

34. The system of claim 33, wherein the desirability of performing the at least one cache transaction is based on one of a frequency of access of at least one cachable entity, a size of at least one cachable entity, a time to one of fetch and materialize at least one cachable entity, a lifetime of at least one cachable entity, and a combination thereof.

35. The system of claim 34, wherein the cache manager performs one of storing at least one cachable entity in the cache, invalidating at least one cachable entity stored in the cache, updating at least one cachable entity stored in the and a combination thereof.

36. The system of claim 34, wherein the cache manager augments the program code with additional code to assist in determining the desirability of performing the at least one cache transaction.

37. The system of claim 34, wherein the cache manager augments the program code with additional code to perform the at least one cache transaction.

* * * * *